United States Patent [19]

Lenhardt

[11] Patent Number: 4,561,929

[45] Date of Patent: Dec. 31, 1985

[54] APPARATUS FOR APPLYING AN ADHESIVE STRIP OF PLASTIC TO A GLASS PANE

[76] Inventor: Karl Lenhardt, Industriestrasse 2-4, 7531 Neuhausen-Hamberg, Fed. Rep. of Germany

[21] Appl. No.: 696,700

[22] Filed: Jan. 31, 1985

[30] Foreign Application Priority Data

Feb. 6, 1984 [DE] Fed. Rep. of Germany ....... 3404006

[51] Int. Cl.$^4$ .............................................. B32B 31/10

[52] U.S. Cl. ...................................... 156/522; 156/99; 156/106; 156/107; 156/109; 156/543; 156/552

[58] Field of Search ................. 156/99, 104, 106, 107, 156/109, 199, 212, 446, 447, 459, 468, 475, 479, 486, 543, 547, 552, 522; 65/43, 58

[56] References Cited

U.S. PATENT DOCUMENTS 2,713,437 7/1955 Broden ................................ 156/486
4,120,740 10/1978 Morgan et al. ...................... 156/522
4,434,024 2/1984 Lisec ..................................... 156/99

*Primary Examiner*—Caleb Weston

*Attorney, Agent, or Firm*—Balogh, Osann, Kramer, Dvorak, Genova & Traub

[57] ABSTRACT

The apparatus serves to apply a plastic strip to a rectangular glass pane so that the strip extends peripherally along all edges of the pane. The apparatus comprises conveying means for conveying the glass panes, which conveying means comprise a horizontal conveyor for supporting and conveying the glass panes standing on their lower edge, backing means, which extend above the horizontal conveyor and are adapted to laterally support the glass panes standing on the horizontal conveyor in a predetermined plane of conveyance, which is slightly inclined from the vertical toward said backing means, pressure-applying means, which are slightly spaced above the horizontal conveyor and serve to force the plastic strip against a moving glass pane, a strip feeder, which is operable to move in synchronism with the horizontal conveyor at the same speed as the latter to feed the plastic strip to the pressure-applying means, a turning mechanism, which when the horizontal conveyor is at a standstill is adapted to turn each glass pane through 90° opposite to the normal direction of travel of the horizontal conveyor, strip-guiding means for cooperating with the pressure-applying device, and severing means for severing the plastic strip.

7 Claims, 10 Drawing Figures

APPARATUS FOR APPLYING AN ADHESIVE STRIP OF PLASTIC TO A GLASS PANE

BACKGROUND OF THE INVENTION

1. Field of the Invention

This invention relates to apparatus for applying to a glass pane a plastic strip, which is adhesive on two mutually opposite, parallel side faces and comprises a plastic material, a moisture-absorbing substance and a metal strip that extends between said two side faces and in the longitudinal direction of the plastic strip, which plastic strip is applied to said glass pane to extend continuously along the periphery of said glass pane at a predetermined distance from the edge of said pane.

A plastic strip which has been applied at one adhesive side face to a glass pane by means of such apparatus constitutes a spacer, and a second glass pane can be applied to and forced against the second adhesive side face of the plastic strip to form an insulating glass pane. The plastic strip used for that purpose is substantially rectangular in cross-section and is made in an extrusion process. The metal strip embedded in the plastic strip serves to stiffen the latter and is preferably corrugated in its longitudinal direction so that the compressive strength of the plastic strip in a direction which is transverse to the adhesive side faces and the flexibility of the plastic strip will be promoted. The moisture-absorbing substance which is incorporated in the plastic strip prevents in the complete insulating glass pane a condensation of enclosed moisture on the inside surfaces of the insulating glass pane.

2. Description of the Prior Art

Compared with spacer frames which have been used before and consist of tubular metal rods and contain in their cavity a moisture-absorbing substance, such as molecular sieves, and which before their insertion between two individual glass panes are coated on both sides with an adhesive composition, such as polyisobutylene, spacers made of such plastic strips afford the advantage that the need for apparatus for making and coating metallic spacer frames is eliminated.

The extruded plastic strips have previously been applied to a glass pane by means of a hand-held applicator, which is supplied with the plastic strip from a supply roll and which is moved along the edge of the glass pane. But such a manually performed operation is not desirable in an insulating glass production line which is automated in other respects.

SUMMARY OF THE INVENTION

For this reason it is an object of the invention to provide for an automatic application of such plastic strips to glass panes an apparatus which can be integrated in an insulating glass production line in which the glass panes are handled in an upright rather than horizontal orientation.

This object is accomplished by apparatus comprising conveying means for conveying the glass panes, which conveying means comprise a horizontal conveyor for supporting and conveying the glass panes standing on their lower edge, backing means, which extend above the horizontal conveyor and are adapted to laterally support the glass panes standing on the horizontal conveyor in a predetermined plane of conveyance, which is slightly inclined from the vertical toward said backing means, pressure-applying means, which are slightly spaced above the horizontal conveyor and serve to force the plastic strip against a moving glass pane which is in contact with one adhesive side face of the plastic strip, a strip feeder, which is operable to move in synchronism with the horizontal conveyor at the same speed as the latter to feed the plastic strip to the pressure-applying means, a turning mechanism, which when the horizontal conveyor is at a standstill is adapted to turn each glass pane through 90° opposite to the normal direction of travel of the horizontal conveyor about an axis which is spaced slightly above the pane-supporting plane of the horizontal conveyor and extends at right angles to said plane of conveyance, strip-guiding means, which are disposed adjacent to and cooperate with the pressure-applying means and are arranged to act on the top of the plastic strip at least during the turning operation, and severing means for severing strip sections in the required length from a plastic strip supply.

The conveying means of that apparatus serve to supply the glass panes standing on edge to a tool by which the adhesive plastic strip can be applied to a glass pane. Also by the conveying means, each glass pane provided with such peripheral plastic strip is delivered to the succeeding working station in an insulating glass production line. In that succeeding station, two individual glass panes spaced by a spacer formed by the plastic strip are joined to form an insulating glass pane. The conveying means comprise a horizontal conveyor and backing means. The horizontal conveyor preferably consists of a horizontal roller conveyor having rollers, which are adapted to be driven in synchronism. Owing to the inclination of the glass panes, the rollers of the roller conveyor are not exactly horizontal but are slightly tilted rearwardly from the horizontal, toward the backing means. The roller conveyor might be replaced by an endless conveyor belt having a horizontally traveling upper course. The backing means for laterally supporting the glass panes may consist of a set of backing rollers, which are rotatably mounted in a frame and are freely rotatable or adapted to be driven in synchronism with the horizontal conveyor. The axes of such rollers are not exactly vertical but are slightly inclined to the rear from the vertical plane. The backing means may alternatively comprise a planar air cushion wall which is slightly rearwardly inclined from the vertical and provided with air discharge orifices for generating on the front side of the wall an air cushion on which the glass panes can gently slide along the wall.

All backing means described hereinbefore are known in insulating glass production lines.

In apparatus embodying the invention, pressure-applying means are disposed slightly above the horizontal conveyor and serve to apply the plastic strip to a glass pane. The strip is supplied to the pressure-applying means from a supply, particularly from a roll. The pressure-applying means force the adhesive plastic strip against a glass pane which stands on edge of the horizontal conveyor and is moving past the pressure-applying means. The pressure-applying means may simply be a pressure-applying roller havng an axis of rotation which is at right angles to the horizontal conveyor and parallel to the plane defined by the panes being conveyed; that roller acts on the still exposed second adhesive side face of the plastic strip.

The surface of the pressure-applying roller should be made of a material, e.g., of a coating material, which will not stick or will only slightly stick on the side face of the plastic strip. Alternatively, the plastic strip may be moved through a gap between two parallel rollers, which respectively act on the top and bottom sides of the plastic strip and grip the plastic strip between them so that they can force the plastic strip against a glass pane moving between the rollers.

The plane of conveyance is defined as that plane which is tangent to the rear surface of a glass pane traveling through the apparatus, e.g., the plane which is tangent to the backing rollers of a set of backing rollers or, if the backing means comprise an air cushion wall, as the surface of the air cushion wall.

To ensure that a glass pane traveling through the apparatus can be provided with an adhesive plastic strip by stationary pressure-applying means, the plastic strip is supplied to such pressure-applying means by a strip feeder which is adapted to be synchronized with the horizontal conveyor and has a feed rate which equals the velocity of the horizontal conveyor. To preclude a slip between the glass pane and the plastic strip as it is applied, a careful synchronization is required. For this reason the strip feeder is required to supply the plastic strip without a slip. The plastic strip is preferably conveyed by a plurality of pairs of driven rollers, which pairs are arranged one behind the other in the feeding direction of the strip. The rollers of each pair define between them a feeding gap, through which the strip is threaded. Such rollers act on the top and bottom sides of the strip and may have a hard surface, which will be particularly suitable for a slipless feeding. The pairs of rollers of such strip feeder suitably serve also to feed the plastic strip along a suitable path to the pressure-applying means. Alternatively, the plastic strip may be fed by and between two endless conveyor belts, which are driven in synchronism and contact the top and bottom surfaces of the plastic strip.

To ensure that the plastic strip can be applied to the glass pane to form thereon an annular peripheral strip having portions which are parallel to respective edges of the glass pane, the plastic strip being applied must be bent near the corners of the pane. For this purpose the apparatus in accordance with the invention comprises a turning mechanism which when the horizontal conveyor is at a standstill is adapted to turn each glass pane through 90° about an axis which is slightly spaced above the pane-supporting plane of the horizontal conveyor and in a direction which is opposite to the direction of conveyance of the horizontal conveyor. In that case the pressure-applying means and the strip feeder may be stationary. If provided with such turning mechanism, the apparatus embodying the invention will operate as follows:

The glass pane to be provided with the plastic strip is placed on edge on the horizontal conveyor and leaned against the backing means and in this attitude is delivered to the aperture of the horizontal conveyor and is stopped adjacent to the pressure-applying roller under the control of photo-electric detectors or similar sensors which respond to the position of the glass pane. The leading end of a plastic strip disposed between the pressure-applying roller and the surface of the plastic strip is then forced against the surface of the pane near the leading lower corner thereof in that the pressure-applying roller is moved toward the surface of the pane. Thereafter the horizontal conveyor and the strip feeder are started at the same time so that the strip being fed is applied to and forced against the lower edge of the moving glass pane and extends on the glass pane parallel to the lower edge of the latter. As soon as the trailing lower corner of the pane has reached the aperture of the horizontal conveyor, the latter and the strip feeder are stopped at the same time so that the glass pane is stopped in a position in which the pressure-applying roller is closely spaced in front of the trailing edge of the glass pane and the trailing lower corner of the glass pane is close to the pivotal axis of the turning mechanism. From that position the glass pane is then moved by the turning mechanism through 90° opposite to the direction of conveyance of the horizontal conveyor so that after the turning operation the pressure-applying roller is disposed at the leading end of the now lower edge of the pane. Thereafter the horizontal conveyor and the strip feeder are started at the same time so that the cycle described hereinbefore is repeated and the plastic strip is applied to the glass pane along the second edge thereof. This is succeeded by two additional turning steps of the glass pane through 90° each. Each of said turning steps is preceded by an advancing step of the horizontal conveyor. As a result, the plastic strip is applied to the glass pane along all four edges thereof. Finally the plastic strip is severed from a strip supply by a severing device.

The guidance of the strip during each turning operation is of special importance within the scope of the invention because that guidance is to ensure that the plastic strip will be given at each corner a predetermined shape, which should correspond as closely as possible to the contour of the corner of the pane. Specifically, it is to be ensured that the plastic strip will not be excessively shifted inwardly at each corner of the pane because in that case the spacer constituted by the plastic strip in the completed insulating glass pane would be visible when the insulating glass pane has been installed in a sash frame. This is avoided within the scope of the invention by strip-guiding means which are disposed adjacent to the pressure-applying means and cooperate therewith and act on the top of the plastic strip at least during the turning of the pane. In this context the top of the plastic strip is that side of the strip which faces upwardly away from the horizontal conveyor. Acting on the top of the strip, the strip-guiding means prevent the strip from being pulled upwardly adjacent to said guiding means by the previously applied portion of the strip which is raised with the glass pane as it is turned.

The strip-guiding means provide an abutment and the strip is bent around that abutment as the glass pane is turned through 90°. The position and contour of that surface of the strip-guiding means which faces the plastic strip will determine the shape which is imparted to the plastic strip adjacent to the corner of the pane. The strip-guiding means should be so arranged that the turning of the glass pane with the strip portion adhering thereto will not be obstructed by the strip-guiding means or will not be obstructed thereby more than necessary. For this reason the strip-guiding means inasmuch as they contact the plastic strip must extend substantially on the near side of the pivotal axis of the turning mechanism in a view taken in the direction of conveyance. On the other hand, the strip-guiding means will not be able to influence the shape of the corner portions of the plastic strip unless the strip-guiding means extend close to the corner, i.e., as closely as possible to that vertical plane which contains the pivotal axis of the turning mechanism. In dependence on the design of the strip-guiding means, the latter may also guide the plastic strip during the movement of the glass pane past said guiding means although that is not essential.

The position of the pivotal axis of the turning mechanism, the position of the strip-guiding means for guiding the top of the plastic strip, and the position in which the trailing lower corner of each glass pane is stopped by the stoppage of the horizontal conveyor before the glass pane is turned can be selected in relation to each other so as to ensure an optimum shape of the corner portions of the plastic strip.

The pivotal axis of the turning mechanism lies suitably on the level of the pressure-applying means, i.e., on the level of that strip portion which has been applied to the pane along its lower edge, specifically on the level of the center of that strip portion or between that center and the top of that strip portion. The position of the pivotal axis relative to the position assumed by the glass pane when the horizontal conveyor has been stopped should be so selected that the pivotal axis intersects the angle bisector of the trailing lower corner of the glass pane. Such an arrangement will ensure that the lower edge of the glass pane will be exactly on the level of the horizontal conveyor after each turning through 90°.

The strip-guiding means acting on the top of the plastic strip may particularly consist of a roller which is small in diameter and has an axis of rotation that is at right angles to said plane of conveyance. Adjacent to each corner of the pane the strip can be bent around that roller as the glass pane is turned. The position and the diameter of the roller will determine the shape which is assumed by the plastic strip adjacent to each corner of the glass pane as the latter is turned. The thinner the roller, the sharper will be the edge formed by the plastic strip. For glass panes having exactly right-angled corners the diameter of the roller will suitably be smaller than the thickness of the plastic strip and will suitably amount to 2 to 3 mm. If the apparatus is to be used in exceptional cases also for processing glass panes having rounded corners, the use of a roller having a correspondingly larger diameter will be recommendable.

Good results can be produced if the axis of rotation of the roller coincides approximately with the pivotal axis of the turning mechanism. If the axis of rotation of the roller is spaced so much above the pressure-applying device that the lowermost generatrix of the roller is just on the level of the top of the plastic strip which has been applied, the roller may be used to guide the strip also as the latter is applied to the glass pane along the lower edge of the latter. Alternatively, the plastic strip will be formed with a particularly sharp-edged and dimensionally stable corner portion during the turning of the glass pane if the axis of the roller is disposed slightly below and, when viewed in the direction of conveyance, slightly beyond the pivotal axis of the turning device as the pane is turned. In that case the plastic strip will be formed adjacent to the corner with a bulge, which may even have an Ω-shaped configuration.

Instead of such a roller, the strip-guiding means for acting on the top of the plastic strip may comprise a flat holding-down member, which is so arranged that the plastic strip is bent around one end of the holding-down member during the turning operation, or a wedge, which extends with such an inclination toward the top of the plastic strip that after a turning of the pane through 90° the wedge will be directed toward the inner apex of the corner which has been formed in the plastic strip. Alternatively, the plastic strip may be guided during the turning operation in that the strip is gripped at its top and bottom between a pair of gripping jaws disposed on the near side of the pivotal axis when viewed in the direction of conveyance. In that case it will be preferable to grip the plastic strip by another pair of gripping jaws on the opposite side of the pivotal axis but the latter pair of gripping jaws should differ from the first-mentioned pair of jaws in that they are pivoted on the same pivotal axis as and is pivotally moved in synchronism with the mechanism for turning the glass pane.

The turning mechanism suitably comprises two pivoted arms, which extend at right angles to each other and are pivotally movable about their common pivotal axis while maintaining their orientation at right angles to each other and which arms are engageable with the glass pane at two edges thereof which are at right angles to each other. The pivoted arms are suitably provided with pivoted fingers for engaging adjacent edges of the pane as it is turned and said fingers are moved out of the plane of conveyance of the panes after each turning of the glass pane so that the pivoted arms will be clear of the glass pane as they are subsequently swung back to their initial position.

BRIEF DESCRIPTION OF THE DRAWING

FIG. 1 is a front elevation showing the apparatus with a glass pane passing through.

DETAILED DESCRIPTION OF THE PREFERRED EMBODIMENTS

Figure 1:
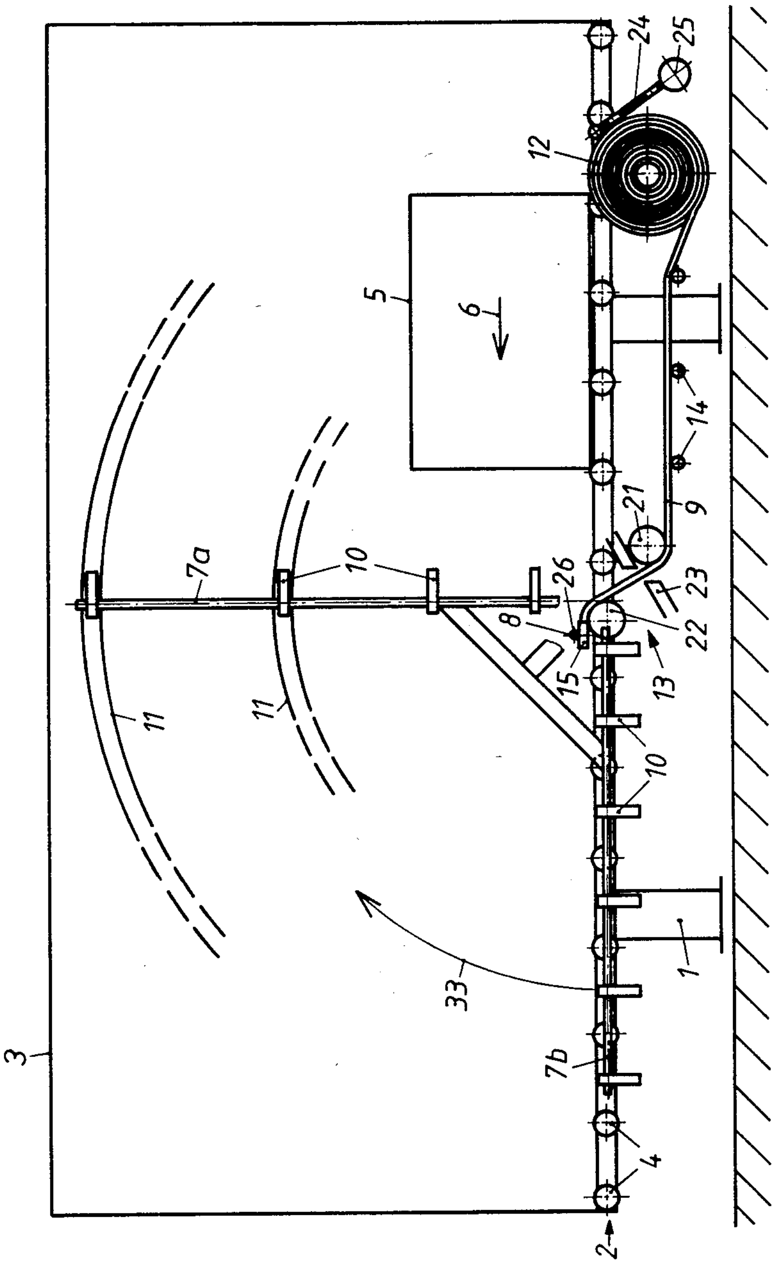

Illustrative embodiments of the invention will now be described with reference to the diagrammatic drawing.

The apparatus comprises an underframe 1, which carries a horizontal conveyor 2 and a backing wall 3, which extends above the horizontal conveyor 2. The horizontal conveyor 2 comprises a horizontally extending row of rollers 4, which are driven in synchronism and have axes that are not exactly horizontal but are inclined to the rear, toward the backing wall, by a few degrees from the horizontal. Analogously the backing wall 3 is not exactly vertical but is inclined to the rear by a few degrees from the vertical. As a result, the axes of the rollers 4 are at right angles to the forward surface of the backing wall 3. By the inclination of the horizontal conveyor 2 and of the backing wall 3 it is ensured that glass panes 5 which stand on edge on the rollers 4 and lean against the backing wall 3 and in that position are conveyed in the direction indicated by the arrow 6 will not tilt forwardly and fall from the horizontal conveyor even though special retaining means are not provided. To ensure a gentle conveyance of the glass panes 5, the backing wall 3 consists suitably of an air cushion wall. For this purpose it is provided in its surface with a multiplicity of regularly spaced apart air discharge orifices, through which air is blown by means of a blower to emerge on the forward face of the backing wall 3 so that a small clearance will be defined between the backing wall 3 and each glass pane 5 leaning on that wall. The air discharge orifices in the backing wall 3 and the blower are not shown in the drawings because they are known in the art.

Figure 8:
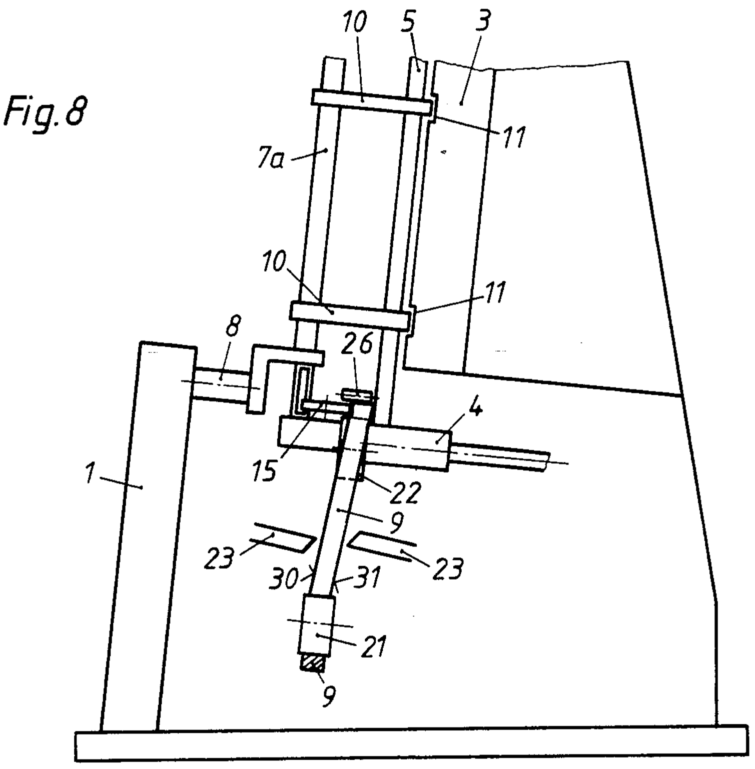
FIG. 8 is a side elevation on line VIII—VIII in FIG. 2 viewed in the direction of conveyance.

The apparatus includes a turning mechanism comprising two pivoted arms 7*a* and 7*b*, which extend at right angles to each other and are parallel to and spaced from the forward surface of the backing wall 3. The common pivotal axis 8 of the two pivoted arms 7*a* and 7*b* is at right angles to the backing wall 3 and is disposed at the center of the horizontal conveyor and slightly spaced above the rollers 4. The pivoted arms 7*a* and 7*b* are spaced such a distance from the backing wall 3 that a glass pane 5 having a plastic strip 9 bonded to one side face can be freely conveyed between the pivoted arms 7*a* and 7*b* and the backing wall 3. Each of the pivoted arms 7*a* and 7*b* carries fingers 10, which are pivoted on an axis that is parallel to the respective pivoted arm 7*a* or 7*b*. Said fingers 10 can be pivotally moved between two end positions. In one end position the fingers extend at right angles to the backing wall 3 through the plane of conveyance for the panes (FIG. 8). In the other end position the fingers are spaced above the plane of conveyance for the panes so that they will not obstruct the conveyance of a pane 5 in the direction of the arrow 6. The fingers 10 will be pivotally moved to that position in which they extend through the plane of conveyance for the panes (FIG. 8), when it is desired to use the fingers for turning a glass pane 5 through 90° in the direction of the arrow 33, opposite to the direction of conveyance 6. For that purpose the fingers 10 engage those two edges of the glass pane 5 which are adjacent to the pivoted arms 7*a* and 7*b* so that the glass pane will be held by the fingers 10 as the glass pane is turned. The fingers 10 have such a length that their tips move in semicircular grooves 11 in the backing wall 3 as the glass pane 5 is turned.

The underframe 1 accommodates also a supply reel 12, which carries a supply roll formed by the plastic strip 9 that is to be applied to the glass panes 5 to form a spacer frame thereon. Viewed in the direction of conveyance 6 the reel 12 is disposed at the near end of the apparatus and its axis of rotation is at right angles to the backing wall 3 and disposed below the horizontal conveyor. A strip feeder 13 shown more in detail in FIGS. 2 to 7 is provided and serves to withdraw the plastic strip 9 from the reel 12 in the direction of conveyance 6. The plastic strip moves initially over some freely rotatable backing rollers 14, which are disposed below the horizontal conveyor, and subsequently enters the strip feeder 13, which deflects the strip in an upward direction. The plastic strip thus moves above the horizontal conveyor 2 and is then deflected once more to extend in a horizontal direction into the gap between the backing wall 3 and a pressure-applying roller 15, which is disposed close to the pivotal axis 8 of the pivoted arms 7*a* and 7*b* and in front of the backing wall 3 at an adjustable distance therefrom and has an axis of rotation that is parallel to the backing wall 3 and at right angles to the direction of conveyance 6.

The strip feeder 13 comprises two pairs of endless conveyor belts 16, 17 and 18, 19. These pairs are arranged one behind the other. The conveyor belts of each pair engage the plastic strip 9 at its top and bottom so that the plastic strip is gripped between and forcibly conveyed by the endless conveyor belts. The conveyor belts 16 to 19 are trained around reversing pulleys 20, 21 and 22. The pulleys 21 and 22 serve also to deflect the plastic strip 9 and for that purpose are larger in diameter than the remaining rollers 20, which serve only to deflect the conveyor belts 16 to 19. At least one of the reversing pulleys for each pair of conveyor belts is driven. Preferably the reversing pulleys 21 and 22 for each pair of conveyor belts are driven. There is a space between the two pairs of conveyor belts 16, 17 and 18, 19. That space accommodates severing means, which serve to sever the plastic strip 9 and comprise two knives 23, which extend at right angles to the plastic strip 9 and are movable in mutually opposite directions to cooperate with each other. A pivoted sensing arm 24 is associated with the reel 12 and has a pivotal axis which is parallel to the axis of rotation of the reel 12. The sensing arm 24 is in contact with the periphery of the roll of strip on the reel 12 and is provided with an angular position pick-up, which will deliver a signal whenever the supply of plastic strip on the reel 12 is about to be exhausted.

Figure 2:
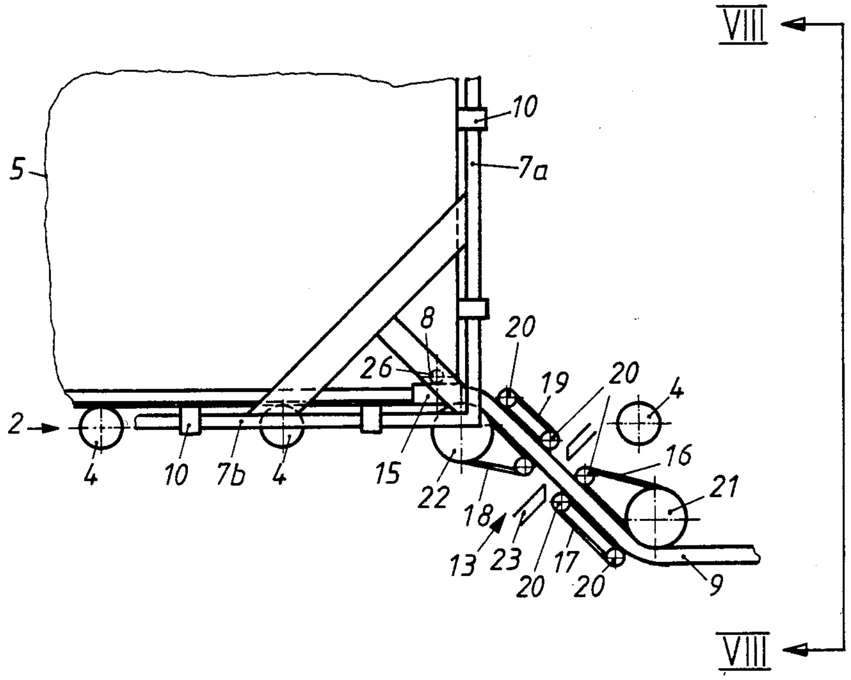
FIG. 2 is an enlarged elevation showing a portion of the apparatus of FIG. 1 immediately before the beginning of a turning operation.
Figure 4:
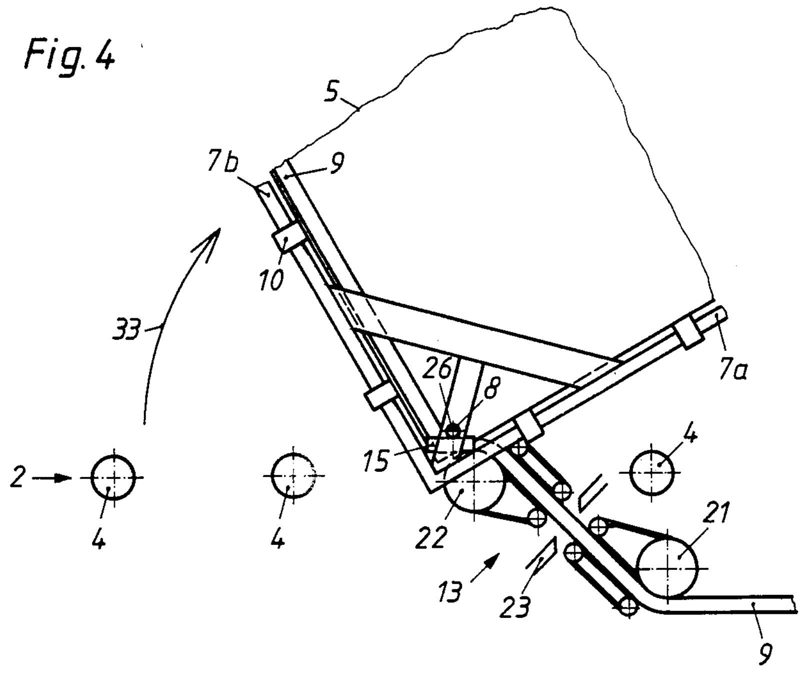
FIG. 4 is a view that is similar to FIG. 2 but shows a position assumed during the turning operation.
Figure 5:
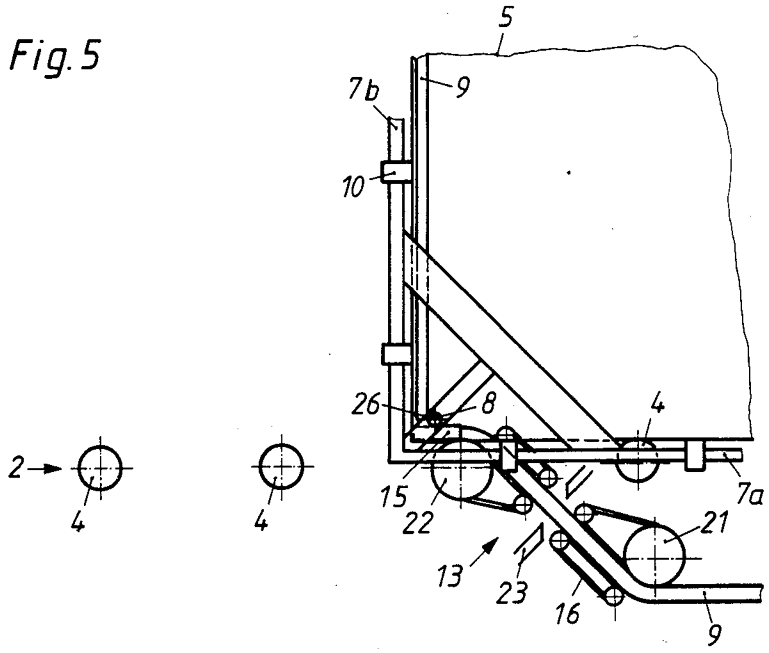
FIG. 5 is a view that is similar to FIG. 2 but shows a position assumed at the end of a turning operation.

The apparatus operates as follows:

A glass pane 5 is placed on the horizontal conveyor 2 to stand on edge thereon and to lean against the backing wall 3 and in this attitude is conveyed in the direction of the arrow 6 until the leading edge of that pane is adjacent to the pressure-applying roller 15 and the leading end of the plastic strip 9 is disposed between the pressure-applying roller 15 and the glass pane 5. When that position has been reached, the drive for the horizontal conveyor 2 is stopped so that the glass pane 5 is arrested for a short time. Now the pressure-applying roller 15 is moved into engagement with the side face of the glass pane 5 so that the leading end of the plastic strip 9 is forced against the glass pane and the strip adheres to said pane owing to the above-mentioned properties of that strip. The horizontal conveyor and the strip feeder 13 are now started at the same time to move exactly at the same speed. As a result, the plastic strip 9 is applied to the moving glass pane 5 to extend parallel to the lower edge of the pane. Thereafter the drives of the horizontal conveyor 2 and of the strip feeder 13 are stopped again shortly before the trailing rising edge of the pane has reached the pressure-applying roller 15. In that position, shown in FIG. 2, the trailing lower corner of the pane lies on the bisector of the angle included by the two pivoted arms 7*a* and 7*b*. The pivotal axis 8 of the pivoted arms 7*a* and 7*b* lies also on that bisector. The fingers 10 are then swung into the plane of conveyance for the pane (FIG. 8) so that said fingers engage the two adjacent edges of the glass pane 5. The glass pane 5 is now ready to be turned in the direction of the arrow 11 (FIG. 1). For this reason the turning mechanism is operated to turn the glass pane 5 through 90° opposite to the direction of conveyance 6. FIG. 4 shows the glass pane 5 as it is turned. FIG. 5 shows it at the end of the turning operation. To ensure that during the turning of the glass pane the plastic strip 9 will form an exactly defined corner portion which is as exactly right-angled as possible, a freely rotatable guide roller 26 is provided, which has an axis of rotation that is at right angles to the backing wall 3. In the embodiment of the apparatus that is shown in FIGS. 2, 4 and 5 that pivotal axis coincides with the pivotal axis 8 of the pivoted arms *7a* and *7b*.

The guide roller 26 engages the top of the plastic strip 9 and during the turning of the glass pane 5 about a given corner prevents a shifting of the strip to an excessively large distance from that corner. The guide roller 26 serves also to guide the plastic strip 9 as it is applied to the glass pane 5 when the horizontal conveyor is moving. For that purpose the guide roller 26 cooperates with the upper reversing pulley 22, which is contacted by the underside of the plastic strip 9. The strip 9 must move through the gap between the upper reversing pulley 22 and the guide roller 26.

Whereas the upper reversing pulley 22 has the same elevation as the horizontal conveyor 2, it will not contact the glass panes 5 because it is spaced in front of the rollers 4 of the horizontal conveyor (see FIG. 8).

Figure 3:
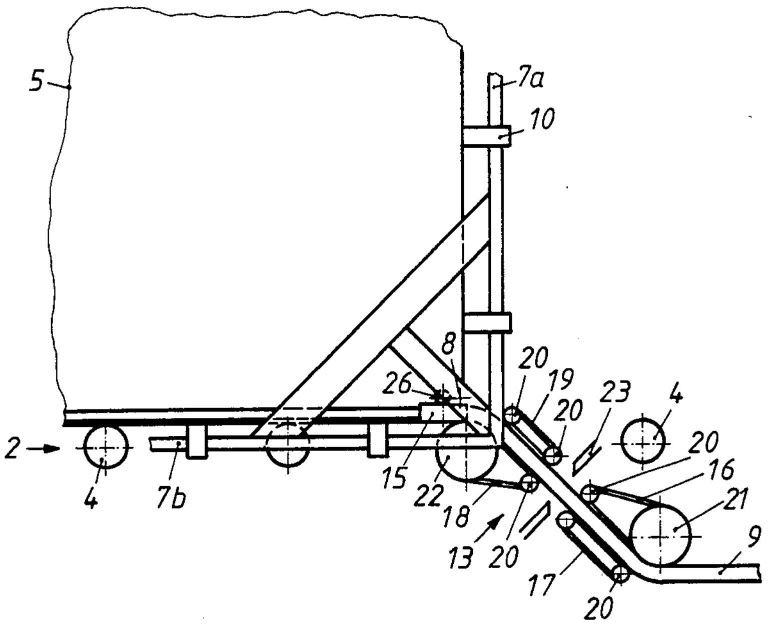
FIG. 3 is similar to FIG. 2 but shows the roller for guiding the strip at a corner in a different position.
Figure 10:
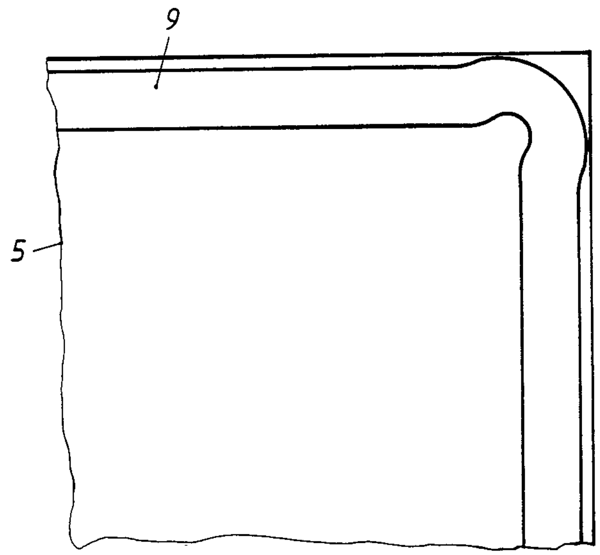
FIG. 10 is a fragmentary elevation showing as a detail a corner portion of a plastic strip applied to a glass pane.

The shape of the corner portions of the plastic strip may alternatively be influenced by a change of the position of the guide roller 26. FIG. 3 shows a modified apparatus in which the guide roller is slightly offset in the direction of conveyance 6 from the pivotal axis 8, which still lies on the bisector of the angle included by the pivoted arms *7a* and *7b*. In the end position from which the glass pane 5 is turned the glass pane is offset from the pivotal axis 8 by the same distance as the guide roller 26. As a result, the plastic strip 9 is bulged near the corner to assume an approximately Ω-shaped configuration as is shown in FIG. 10.

Figure 6:
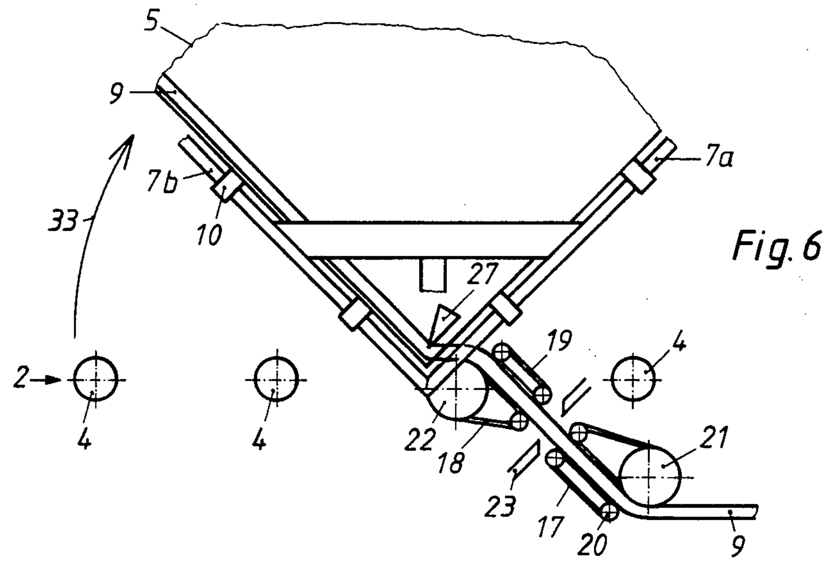
FIG. 6 is a view that is similar to FIG. 4 but shows an embodiment in which the plastic strip is guided near a corner by a wedge rather than a roller.

FIG. 6 shows a modified apparatus in which the guide roller 26 has been replaced by an acute-angled wedge 27, which with its tip acts on the top of the plastic strip 9 and thus assists the shaping of the strip 9 near a corner. But such wedge 27 is less suitable for guiding the strip when the horizontal conveyor 2 and the strip feeder 13 are operating.

Figure 7:
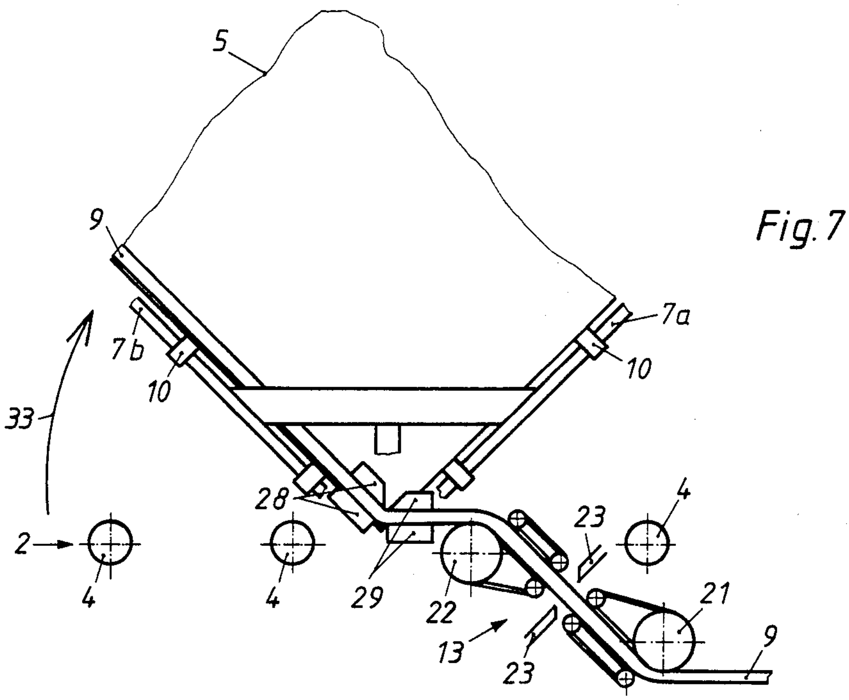
FIG. 7 is a view that is similar to FIG. 4 but shows an embodiment in which the plastic strip is guided near a corner by two pairs of gripping jaws.

In the modified apparatus shown in FIG. 7 the guide roller 26 has been replaced by two pairs of gripping jaws 28 and 29. These pairs are disposed on opposite sides of the pivotal axis 8 of the pivoted arms *7a* and *7b*. The gripping jaws of each of said pairs engage the plastic strip 9 at its top and bottom on opposite sides of the pivotal axis 8 so as to grip the strip. That pair of gripping jaws 28 which are disposed in front when viewed in the direction of conveyance 6 are pivotally movable in unison with the pivoted arm *7b*. The other pair of gripping jaws 29 are not pivotally movable. Such pairs of gripping jaws are particularly suitable for ensuring that the plastic strip 9 that has been applied to the glass pane 5 will be shaped to have right-angled corner portions.

Reverting now to FIG. 5, when the pivotal movement of the pivoted arms *7a* and *7b* has been terminated, their fingers 10 are swung out of the plane of conveyance of the panes and then the drives for the horizontal conveyor 2 and for the strip feeder 13 are started so that the next length portion of the plastic strip 9 is applied to the moving glass pane 5 along the second edge thereof.

Figure 9:
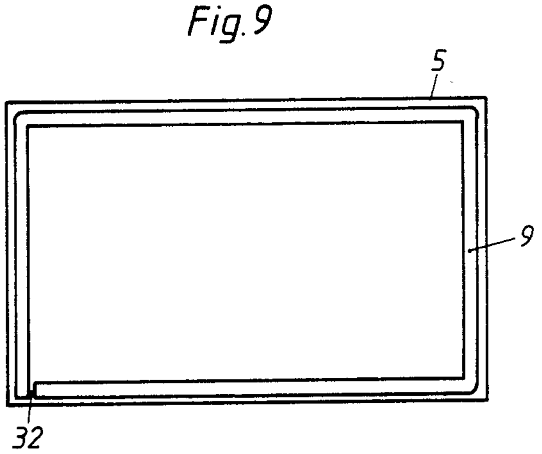
FIG. 9 is an elevation showing a glass pane and a peripherally extending plastic strip applied thereto.

Thereafter, the glass pane is turned once more in the manner described hereinbefore and the plastic strip 9 is subsequently applied to the glass pane 5 along the third edge thereof. The glass pane 5 is then turned through 90° for a last time and the plastic strip 9 is subsequently applied to the glass pane along the fourth edge thereof. Before the glass pane assumes the position of FIG. 2 for the last time, the plastic strip 9 is severed by means of the knives 23 so that the glass pane 5 can immediately be carried off in the direction of the arrow 6 as soon as the strip-applying operation has been completed. FIG. 9 shows in elevation a glass pane 5 provided with an annular, peripherally extending plastic strip 9. There is a gap 32 in the plastic strip 9 at that corner at which the two ends of the plastic strip are disposed. If the apparatus in accordance with the invention is succeeded by an assembling apparatus, in which a second glass pane, which is coextensive with the glass pane 5 provided with the plastic strip 9, as shown in FIG. 9, is applied to that glass pane 5 with a force that is sufficient to ensure the high-strength bond that is required, the plastic strip 9 will be compressed under the pressure applied to its two side faces 30 and 31 so that the two glass panes will approach each other and the interior space between the two glass panes can be vented through the gap left in the plastic strip 9.

The gap 32 left in the plastic strip 9 is not sealed until the glass panes 5 which have been joined to each other have been forced toward each other to form an insulating glass pane having the desired thickness. To seal that gap, a heated element may be moved in contact with the plastic strip 9 around that corner thereof at which the gap 32 is disposed. As a result the plastic material of the thermoplastic plastic strip is softened and the two ends of the plastic strip are joined to each other.

I claim:

1. Apparatus for applying to a glass pane a plastic strip, which is adhesive on two mutually opposite, parallel side faces and comprises a plastic material, a moisture-absorbing substance and a metal strip that extends between said two side faces and in the longitudinal direction of the plastic strip, which plastic strip is applied to said glass pane to extend continuously along the periphery of said glass pane at a predetermined distance from the edge of said pane, characterized in that said apparatus comprises conveying means for conveying the glass panes, which conveying means comprise a horizontal conveyor for supporting and conveying the glass panes standing on their lower edge, backing means, which extend above the horizontal conveyor and are adapted to laterally support the glass panes standing on the horizontal conveyor in a predetermined plane of conveyance, which is slightly inclined from the vertical toward said backing means, pressure-applying means, which are slightly spaced above the horizontal conveyor and serve to force the plastic strip against a moving glass pane which is in contact with one adhesive side face of the plastic strip, a strip feeder, which is operable to move in synchronism with the horizontal conveyor at the same speed as the latter to feed the plastic strip to the pressure-applying means, a turning mechanism, which when the horizontal conveyor is at a standstill is adapted to turn each glass pane through 90° opposite to the normal direction of travel of the horizontal conveyor about an axis which is spaced slightly above the pane-supporting plane of the horizontal conveyor and extends at right angles to said plane of conveyance, strip-guiding means, which are disposed adjacent to and cooperate with the pressure-applying means and are arranged to act on the top of the plastic strip at least during the turning operation, and severing means for severing strip sections in the required length from a plastic strip supply.

2. Apparatus according to claim 1, characterized in that the pivotal axis of the turning mechanism is disposed on the level of the pressure-applying means.

3. Apparatus according to claim 1, characterized in that the strip-guiding means for acting on the top of the plastic strip comprise a roller which is small in diameter and has an axis of rotation that is at right angles to said plane of conveyance.

4. Apparatus according to claim 3, characterized in that the axis of rotation of the roller coincides approximately with the pivotal axis of the turning mechanism.

5. Apparatus according to claim 3, characterized in that the axis of the roller is disposed slightly below and, when viewed in the direction of conveyance, slightly beyond the pivotal axis of the turning mechanism as the pane is turned.

6. Apparatus according to claim 1, characterized in that the turning mechanism comprises two pivoted arms, which extend at right angles to each other and are pivotally movable about their common pivotal axis while maintaining their orientation at right angles to each other and which arms are engageable with the glass pane at two edges thereof which are at right angles to each other.

7. Apparatus according to claim 2, characterized in that the strip-guiding means for acting on the top of the plastic strip comprise a roller which is small in diameter and has an axis of rotation that is at right angles to said plane of conveyance.

* * * * *